(12) United States Patent (10) Patent No.: US 11,167,414 B2
Yokoyama et al. (45) Date of Patent: Nov. 9, 2021

(54) ROBOT, CONTROL METHOD OF ROBOT, AND MACHINING METHOD OF WORKPIECE

(71) Applicant: KABUSHIKI KAISHA YASKAWA DENKI, Kitakyushu (JP)

(72) Inventors: Takeshi Yokoyama, Kitakyushu (JP); Takahiko Kanamori, Kitakyushu (JP); Keisuke Yonehara, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 317 days.

(21) Appl. No.: 15/963,109

(22) Filed: Apr. 26, 2018

(65) Prior Publication Data

US 2018/0326582 A1 Nov. 15, 2018

(30) Foreign Application Priority Data

May 11, 2017 (JP) .............................. JP2017-094965

(51) Int. Cl.
*B25J 9/16* (2006.01)
*B25J 9/00* (2006.01)
(Continued)

(52) U.S. Cl.
CPC ........... *B25J 9/1633* (2013.01); *B25J 9/0084* (2013.01); *B25J 9/0093* (2013.01); *B25J 9/1674* (2013.01);
(Continued)

(58) Field of Classification Search
CPC ...... B25J 9/1633; B25J 9/0084; B25J 9/0093; B25J 9/1674; B25J 9/1694; B25J 11/005;
(Continued)

(56) References Cited

U.S. PATENT DOCUMENTS 5,125,298 A 6/1992 Smith
8,086,340 B2 12/2011 Kondo et al.
(Continued)

FOREIGN PATENT DOCUMENTS

CN 105563463 5/2016
JP 61-221803 10/1986
(Continued)

OTHER PUBLICATIONS

Japanese Office Action for corresponding JP Application No. 2017-094965, dated Dec. 27, 2019 (w/ machine translation).
(Continued)

*Primary Examiner* — Jeff A Burke
*Assistant Examiner* — Joshua Alexander Garza
(74) *Attorney, Agent, or Firm* — Mori & Ward, LLP

(57) ABSTRACT

A robot includes a robot body, a control processor, a detection circuit, a memory, and a determining circuit. The control processor is configured to control the robot body to perform a work on a workpiece while the workpiece is conveyed. The detection circuit is configured to detect external force which the robot body receives from the workpiece. The memory is to store a threshold force. The determining circuit is configured to determine whether the external force is equal to or larger than the threshold force.

21 Claims, 5 Drawing Sheets

(51) Int. Cl.
  *G05B 19/418* (2006.01)
  *B25J 13/08* (2006.01)
  *B25J 11/00* (2006.01)
(52) U.S. Cl.
  CPC ........... *B25J 9/1694* (2013.01); *B25J 11/005* (2013.01); *B25J 13/085* (2013.01); *G05B 19/4182* (2013.01); *Y10S 901/10* (2013.01); *Y10S 901/46* (2013.01)
(58) Field of Classification Search
  CPC ....... B25J 13/085; B25J 5/02; G05B 19/4182; Y10S 901/10; Y10S 901/46
  See application file for complete search history.

(56) References Cited

U.S. PATENT DOCUMENTS

| | | | | |
|---|---|---|---|---|
| 8,738,180 | B2* | 5/2014 | Shi | G05B 19/4182 700/259 |
| 2006/0191476 | A1* | 8/2006 | Nagase | B05C 1/02 118/258 |
| 2011/0048649 | A1 | 3/2011 | Komatsu et al. | |
| 2011/0118876 | A1 | 5/2011 | Hayama et al. | |
| 2014/0310933 | A1 | 10/2014 | Komatsu et al. | |
| 2014/0310944 | A1 | 10/2014 | Komatsu et al. | |
| 2014/0317898 | A1 | 10/2014 | Komatsu et al. | |
| 2014/0331467 | A1 | 11/2014 | Komatsu et al. | |
| 2014/0331487 | A1 | 11/2014 | Komatsu et al. | |
| 2015/0127158 | A1* | 5/2015 | Shimodaira | B25J 9/1694 700/258 |
| 2016/0121480 | A1* | 5/2016 | Okahisa | B25J 9/1643 700/245 |
| 2016/0136813 | A1 | 5/2016 | Hiro et al. | |
| 2017/0007336 | A1* | 1/2017 | Tsuboi | A61B 34/30 |

FOREIGN PATENT DOCUMENTS

| | | |
|---|---|---|
| JP | S61-221803 A | 10/1986 |
| JP | 2009-178829 A | 8/2009 |
| JP | 5939364 B1 | 6/2016 |

OTHER PUBLICATIONS

German Office Communication for corresponding DE Application No. 102018206954.9, dated Mar. 25, 2020.

Chinese Office Action for corresponding CN Application No. 201810424948.8, dated Dec. 25, 2020 (w/ English machine translation).

* cited by examiner

ROBOT, CONTROL METHOD OF ROBOT, AND MACHINING METHOD OF WORKPIECE

CROSS-REFERENCE TO RELATED APPLICATION

This application claims priority from Japanese Patent Application No. 2017-094965 filed with the Japan Patent Office on May 11, 2017, the entire content of which is hereby incorporated by reference.

BACKGROUND

1. Technical Field

An embodiment of the disclosure relates to a robot, a control method of a robot, and a machining method of a workpiece.

2. Description of the Related Art

A machining apparatus disclosed in Japanese Patent No. 5939364 includes a conveying device for conveying a workpiece and a plurality of robots for machining a workpiece being conveyed by the conveying device.

SUMMARY

A robot according to one aspect of the present disclosure includes a robot body, a control processor, a detection circuit, a memory, and a determining circuit. The control processor is configured to control the robot body to perform a work on a workpiece while the workpiece is conveyed. The detection circuit is configured to detect external force which the robot body receives from the workpiece. The memory is to store a threshold force. The determining circuit is configured to determine whether the external force is equal to or larger than the threshold force.

Also, a control method of a robot according to another aspect of the present disclosure includes controlling a robot to perform a work on a workpiece while the workpiece is conveyed, detecting external force which a robot body of the robot receives from the workpiece, storing a threshold force, and determining whether the external force is equal to or larger than the threshold force.

Also, a machining method of a workpiece according to another aspect of the present disclosure includes performing a work on a workpiece by a robot while the workpiece is conveyed, detecting external force which a robot body of the robot receives from the workpiece, storing a threshold force, and determining whether the external force is equal to or larger than the threshold force.

DESCRIPTION OF THE EMBODIMENTS

Figure 1:
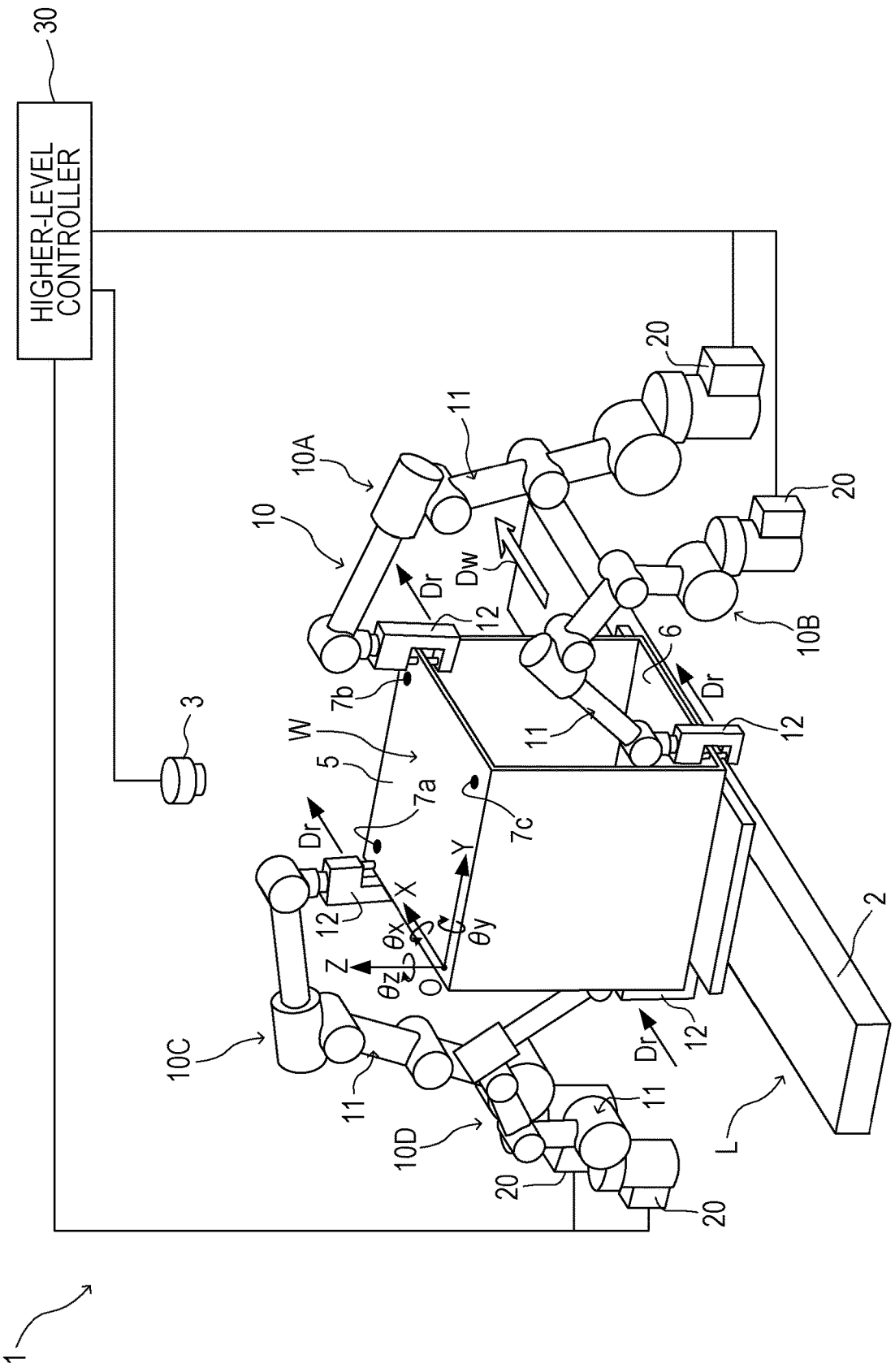
FIG. 1 is an explanatory view illustrating an example of an entire configuration of a robot system having a robot according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Hereinafter, an embodiment will be described with reference to the drawings.

1. Entire Configuration of Robot System

Firstly, an example of an entire configuration of a robot system 1 having a robot 10 according to an embodiment will be described with reference to FIG. 1.

As illustrated in FIG. 1, the robot system 1 is a system for machining a workpiece W being conveyed by a conveyor 2 in a manufacturing line L of the workpiece W using a robot 10. The robot system 1 includes the conveyor 2, a camera 3, a plurality of robots 10, and a higher-level controller 30.

The conveyor 2 conveys the workpiece W along a prescribed movement route. Arrow Dw in FIG. 1 indicates the movement direction of the workpiece W by the conveyor 2. The conveyor 2 continues the movement of the workpiece W without stopping the workpiece W even in a work position by the robot 10. The workpiece W is constituted by a single component or a plurality of components. The workpiece W includes a top board portion 5 and a bottom board portion 6 for which a prescribed work is performed. The workpiece W is not particularly limited. The workpiece W is, for example, a body of a vehicle.

The plurality of robots 10 is arranged in the vicinity of the movement route of the workpiece W by the conveyor 2. In this example, the robot system 1 includes four robots as the plurality of robots 10. That is, the robot system 1 includes a first robot 10A, a second robot 10B, a third robot 10C, and a fourth robot 10D. Among these, the first robot 10A and the third robot 10C have arm portions 104, 105, and the like (see FIG. 2 described later) which are longer than those of the second robot 10B and the fourth robot 10D. Therefore, the workable ranges of the first robot 10A and the third robot 10C are relatively large. In this example, these first robot 10A and third robot 10C are arranged to face each other on both sides in the width direction of the conveyor 2 downstream of the movement route of the workpiece W. On the other hand, the second robot 10B and the fourth robot 10D have arm portions 104, 105, and the like (see FIG. 2 described later) which are shorter than those of the first robot 10A and the third robot 10C. The workable ranges of the second robot 10B and the fourth robot 10D are relatively small. These second robot 10B and fourth robot 10D are arranged to face each other on both sides in the width direction of the conveyor 2 upstream of the movement route of the workpiece W.

It is noted that the number of robots 10 to be installed is not limited to four. The number of robots 10 disposed to the robot system 1 may be one, or may be two or more other than four. Also, the workable ranges of the plurality of robots 10 may be the same. Also, the arrangement embodiment of the robots 10 may be an embodiment other than the above-described embodiment.

Each of the first robot 10A to the fourth robot 10D includes a robot body 11, and a robot controller 20 disposed in the base portion of the robot body 11. The robot body 11 is a seven-axis robot having seven joint portions. The robot body 11 includes an end effector 12 on the tip of the robot body 11. The robot controller 20 of each of the robots 10A to 10D is connected to a higher-level controller 30.

It is noted that some or all of the robots 10A to 10D may be a robot (for example, a six-axis robot) other than a seven-axis robot. Also, the robot controller 20 may be arranged and separated from the robot body 11.

The first robot 10A performs a prescribed work for a portion on one side in the width direction of the top board portion 5 of the moving workpiece W (the workpiece W in a state of moving) while moving the end effector 12 to follow the workpiece W. The second robot 10B performs the above-described prescribed work for a portion on one side in the width direction of the bottom board portion 6 of the moving workpiece W while moving the end effector 12 to follow the workpiece W. The third robot 10C performs the above-described prescribed work for a portion on the other side in the width direction of the top board portion 5 of the moving workpiece W while moving the end effector 12 to follow the workpiece W. The fourth robot 10D performs the above-described prescribed work for a portion on the other side in the width direction of the bottom board portion 6 of the moving workpiece W while moving the end effector 12 to follow the workpiece W. Arrow Dr in FIG. 1 indicates the movement direction of the end effector 12.

The above-described prescribed work performed by each of the robots 10A to 10D contains a process in which the moving workpiece W is temporarily brought into contact with the end effector 12. Such a work includes, for example, riveting, nailing, spot welding, stapling, and bolting. However, the work performed by the robots 10A to 10D is not limited to these works.

The camera 3 is installed above the work position for detecting the three-dimensional position of the workpiece W in real time when each of the robots 10A to 10D performs the above-described prescribed work. The camera 3 is connected to the higher-level controller 30, and the detection result by the camera 3 is transmitted to the higher-level controller 30.

It is noted that the number of cameras 3 to be installed is not limited to one, and may be two or more. Also, in place of the camera 3, a sensor (for example, a laser sensor) other than the camera capable of detecting the three-dimensional position of the workpiece W may be used. This can further enhance the detection accuracy of the three-dimensional position of the workpiece W.

A plurality of marks 7 (7a to 7c) for positional detection is disposed to the top board portion 5 of the workpiece W. In the example illustrated in FIG. 1, three marks 7a to 7c are each disposed in the vicinities of corners of the top board portion 5. These three marks 7a to 7c define a three-dimensional coordinate system (hereinafter, referred to as a "workpiece coordinate system") in which a prescribed position of the workpiece W is set to be an origin point O. In this example, the origin point O is set in the vicinity of one corner of the top board portion 5. A workpiece coordinate system containing this origin point O, and the X-axis, Y-axis and Z-axis orthogonal to each other is set. In each workpiece W, the coordinate of a teaching point to serve as a work target in the workpiece coordinate system is set.

Each of the above-described three marks 7a to 7c is detected by the camera 3. Then, an image processor 31 (see FIG. 3 described later) of the higher-level controller 30 having received the detection result of the marks 7a to 7c measures the three-dimensional position and posture (including rotation amount $\theta x$ around the X-axis, rotation amount $\theta y$ around the Y-axis, and rotation amount $\theta z$ around the Z-axis) of the workpiece W. The coordinate of a teaching point in the above-described workpiece coordinate system is converted to a robot coordinate system corresponding to each of the robots 10A to 10D, and is also sequentially corrected based on the measured three-dimensional position and posture of the workpiece W. Each of the robots 10A to 10D performs a prescribed work based on the above-described corrected coordinate of the teaching point.

It is noted that the number of marks 7 and the positions of the marks 7 disposed to the workpiece W may be other than the above-described number and positions. Also, the detection target of the camera 3 is not limited to the marks 7, as long as it can be assured as a reference for positional detection. Examples of the detection target may include a concavo-convex shape of the workpiece W and a pore of the workpiece W.

2. Configuration of Robot

Next, an example of a configuration of the first robot 10A will be described with reference to FIG. 2. The third robot 10C has a configuration equivalent to the first robot 10A. The second robot 10B and the fourth robot 10D also fundamentally have a configuration equivalent to the first robot 10A, except for the dimensions of the arm portions 104 and 105, and the like. Therefore, the configuration of the first robot 10A will be described herein.

Figure 2:
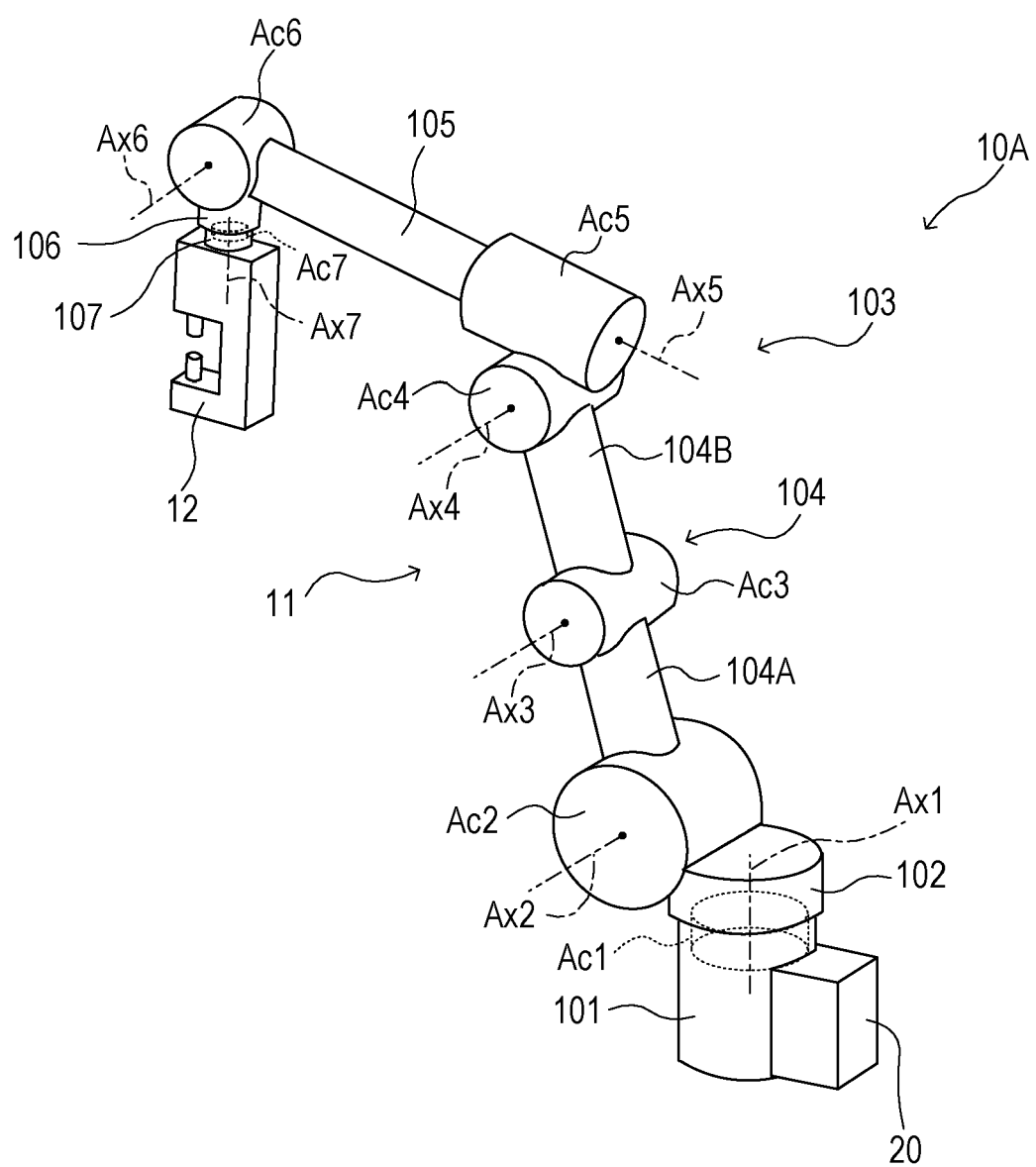
FIG. 2 is an explanatory view illustrating an example of a configuration of a robot.

As illustrated in FIG. 2, the first robot 10A includes the robot body 11 and the robot controller 20. The robot body 11 includes a base 101, a turning portion 102, and an arm 103.

The base 101 is fixed to the installation surface of the first robot 10A by, for example, an anchor bolt. The installation surface is, for example, a floor surface in the manufacturing line L. However, the base 101 may be fixed to a surface (for example, a ceiling surface and a side surface) other than the floor surface.

The turning portion 102 is supported by a tip portion opposite the installation surface of the base 101 in such a manner as to be turnable around a rotation axis center Ax1 which is substantially perpendicular to the installation surface. An actuator Ac1 is disposed to a joint portion between this turning portion 102 and the base 101. This actuator Ac1 drives the turning portion 102 to turn around the rotation axis center Ax1 with respect to the tip portion of the base 101.

The arm 103 is turnably supported by one side portion of the turning portion 102. This arm 103 includes a lower arm portion 104, an upper arm portion 105, a wrist portion 106, and a flange portion 107.

The lower arm portion 104 includes a first arm portion 104A and a second arm portion 104B. The first arm portion 104A is supported by one side portion of the turning portion 102 in such a manner as to be turnable around a rotation axis center Ax2 which is substantially perpendicular to the rotation axis center Ax1. An actuator Ac2 is disposed to a joint portion between this first arm portion 104A and the turning portion 102. This actuator Ac2 drives the first arm portion 104A to turn around the rotation axis center Ax2 with respect to one side portion of the turning portion 102. The second arm portion 104B is supported by the tip side of the first arm portion 104A in such a manner as to be turnable around a rotation axis center Ax3 which is substantially parallel to the rotation axis center Ax2. An actuator Ac3 is disposed to a joint portion between this second arm portion 104B and the first arm portion 104A. This actuator Ac3 drives the second arm portion 104B to turn around the rotation axis center Ax3 with respect to the tip side of the first arm portion 104A.

The upper arm portion 105 is supported by the tip side of the lower arm portion 104 in such a manner as to be turnable around a rotation axis center Ax4 which is substantially parallel to the rotation axis center Ax3 as well as to be revolvable around a rotation axis center Ax5 which is substantially perpendicular to the rotation axis center Ax3. An actuator Ac4 is disposed to a joint portion between this upper arm portion 105 and the lower arm portion 104. This actuator Ac4 drives the upper arm portion 105 to turn around the rotation axis center Ax4 with respect to the tip side of the lower arm portion 104. Furthermore, an actuator Ac5 is disposed between the upper arm portion 105 and the actuator Ac4. This actuator Ac5 drives the upper arm portion 105 to revolve around the rotation axis center Ax5 with respect to the tip side of the lower arm portion 104.

The wrist portion 106 is supported by the tip side of the upper arm portion 105 in such a manner as to be turnable around a rotation axis center Ax6 which is substantially perpendicular to the rotation axis center Ax5. An actuator Ac6 is disposed to a joint portion between this wrist portion 106 and the upper arm portion 105. This actuator Ac6 drives the wrist portion 106 to turn around the rotation axis center Ax6 with respect to the tip side of the upper arm portion 105.

The flange portion 107 is supported by the tip side of the wrist portion 106 in such a manner as to be revolvable around a rotation axis center Ax7 which is substantially perpendicular to the rotation axis center Ax6. An actuator Ac7 is disposed to a joint portion between this flange portion 107 and the wrist portion 106. This actuator Ac7 drives the flange portion 107 to revolve around the rotation axis center Ax7 with respect to the tip side of the wrist portion 106.

The end effector 12 is attached to the tip of the flange portion 107. The end effector 12 revolves together with the flange portion 107 around the rotation axis center Ax7 of the flange portion 107. The end effector 12 can be brought into contact with the top board portion 5 or the bottom board portion 6 of the workpiece W to perform a prescribed work for the top board portion 5 or the bottom board portion 6.

As described above, the robot body 11 is a seven-axis robot including seven actuators Ac1 to Ac7 and seven joint portions. Specifically, the robot body 11 is fundamentally a six-axis robot. That is, the robot body 11 can freely change the position and posture of the end effector 12 by the turning around the rotation axis Ax1 of the turning portion 102, the turning around the rotation axis center Ax2 of the lower arm portion 104, the turning around the rotation axis center Ax4 and the revolution around the rotation axis center Ax5 of the upper arm portion 105, the turning around the rotation axis center Ax6 of the wrist portion 106, and the revolution around the rotation axis center Ax7 of the flange portion 107. Furthermore, the robot body 11 additionally has redundancy of adjusting a distance between the turning portion 102 and the upper arm portion 105 by the turning around the rotation axis center Ax3 of the second arm portion 104B in the lower arm portion 104. Accordingly, the robot body 11 is configured as a seven-axis robot. It is noted that the robot body 11 does not need to be a seven-axis robot. The robot body 11 may be, for example, a six-axis robot which includes the lower arm portion 104 as a single arm portion without having the actuator Ac3 in the configuration illustrated in FIG. 2.

Each of the actuators Ac1 to Ac7 which drive the joint portions includes a servo motor (see FIG. 3 described later), a speed reducer, a brake, and the like. The servo motor, speed reducer, brake and the like do not need to be arranged on the rotation axes Ax1 to Ax7, and may be arranged in positions away from these rotation axes Ax1 to Ax7.

In the above description, the "revolution" and the "turning" are distinguished by terming the rotation around a rotation axis center along the longitudinal direction (or the extending direction) of the arm 103 as "revolution", and terming the rotation around a rotation axis center substantially perpendicular to the longitudinal direction (or the extending direction) of the arm 103 as "turning".

3. Configuration of Higher-Level Controller and Robot Controller

Figure 3:
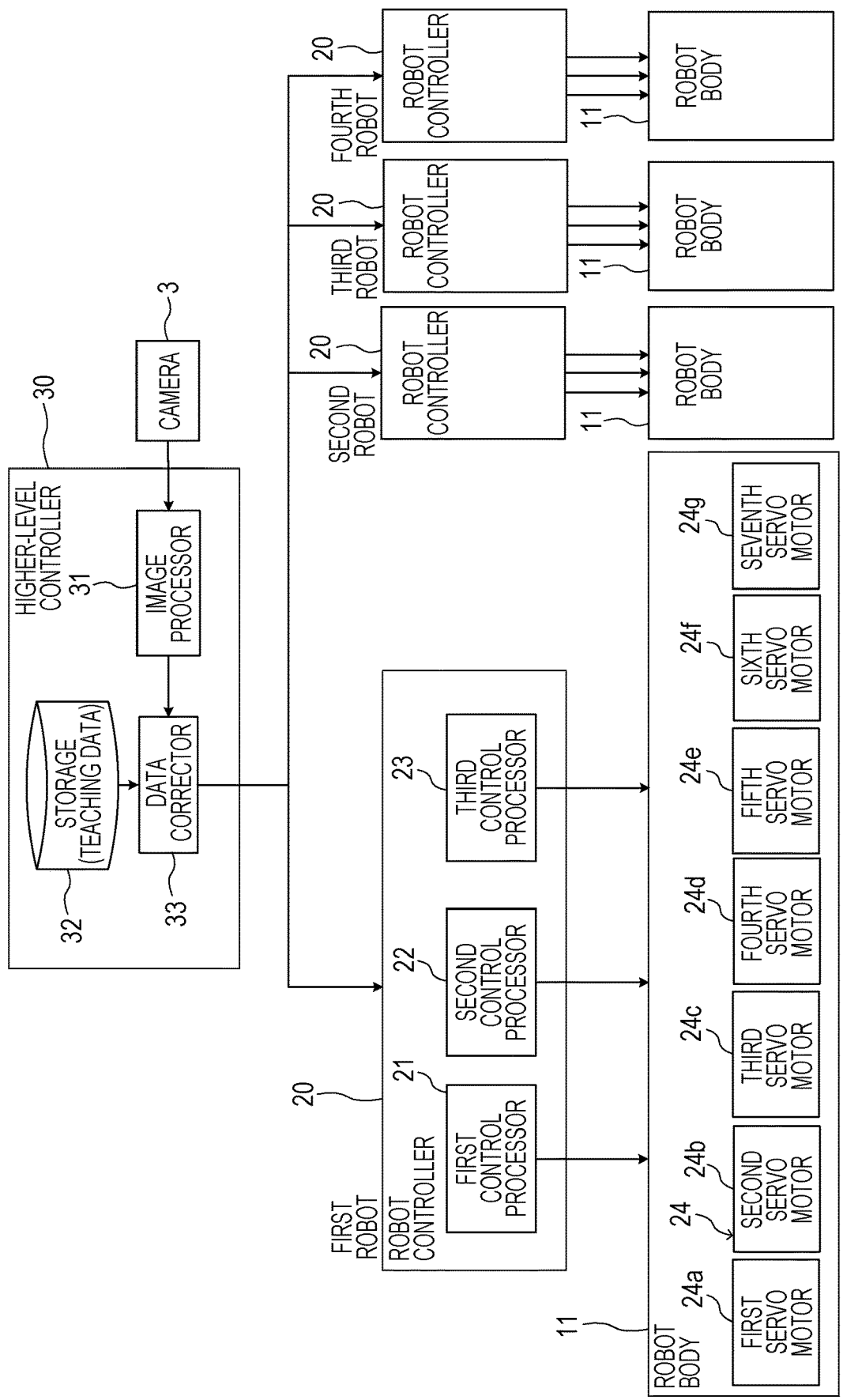
FIG. 3 is a block diagram illustrating an example of a configuration of a higher-level controller and a robot controller.

Next, an example of a configuration of the higher-level controller 30 and the robot controller 20 will be described with reference to FIG. 3.

The higher-level controller 30 contains, for example, a programmable logic controller (PLC) and/or a personal computer (PC). The higher-level controller 30 includes the image processor 31, a storage 32, and a data corrector 33.

The storage 32 stores, for example, teaching data for defining the actions of the first robot 10A to the fourth robot 10D for each robot. As previously described, the coordinate of a teaching point as a work target in a workpiece coordinate system is set for each workpiece W. The coordinate is converted into a robot coordinate system corresponding to each of the robots 10A to 10D so as to prepare teaching data. The prepared teaching data are stored in the storage 32. The conversion of the coordinate of the workpiece coordinate system into the coordinate of the robot coordinate system is performed on the premise that the workpiece W is at rest in a prescribed reference position with a prescribed reference posture.

The image processor 31 executes a prescribed three-dimensional measurement operation based on a detection result of three marks 7a to 7c by the camera 3. Accordingly, the image processor 31 measures (acquires) the three-dimensional position and posture of the workpiece W. Thus, the position of the workpiece W is detected by the camera 3 and the image processor 31. This eliminates the need for an encoder of a motor (not illustrated) of the conveyor 2. Consequently, the conveyor 2 can be reduced in cost.

The data corrector 33 corrects the teaching data read from the storage 32 for each of the robots 10A to 10D, based on the measurement result of the image processor 31. In the present embodiment, work is performed for the moving workpiece W. Therefore, the position of the workpiece W varies during work. For this reason, the data corrector 33 sequentially corrects the teaching data for relatively short periods. The data corrector 33 transmits the corrected teaching data as a positional command to the robot controller 20 of each of the robots 10A to 10D. Also, the position and posture of the moving workpiece W may deviate from the reference position due to, for example, mechanical errors of the conveyor 2 in some cases. In the present embodiment, the data corrector 33 corrects the teaching data based on the measurement result of the image processor 31, which enables reduction of the influence by the above-described deviation. As a result, the robot body 11 can precisely perform a prescribed work for the moving workpiece W while causing the end effector 12 to follow the moving workpiece W.

The robot controller 20 of each of the first robot 10A to the fourth robot 10D includes a first control processor 21, a second control processor 22, and a third control processor 23. In FIG. 3, the control processors 21 to 23 in the robot controller 20 of each of the second robot 10B to the fourth robot 10D are omitted for the prevention of complication.

Also, the robot body 11 of each of the first robot 10A to the fourth robot 10D includes seven servo motors 24 which drive the above-described seven joint portions. That is, the seven servo motors 24 are a first servo motor 24a, a second servo motor 24b, a third servo motor 24c, a fourth servo motor 24d, a fifth servo motor 24e, a sixth servo motor 24f, and a seventh servo motor 24g. In FIG. 3, the servo motors 24a to 24g in the robot body 11 of each of the second robot 10B to the fourth robot 10D are omitted for the prevention of complication.

The control contents of the first control processor 21, the second control processor 22, and the third control processor 23 in the robot controller 20 are common among the first robot 10A to the fourth robot 10D.

The first control processor 21 controls the plurality of servo motors 24a to 24g based on the corrected teaching data (positional commands) received from the higher-level controller 30. Accordingly, the first control processor 21 controls the robot body 11 to cause the end effector 12 on the tip of the robot body 11 to follow the moving workpiece W and perform the above-described prescribed work for the moving workpiece W.

Here, as previously described, a prescribed work includes a process in which the moving workpiece W is temporarily brought into contact with the end effector 12. A prescribed work includes, for example, a process in which the end effector 12 grasps the workpiece W so that the workpiece W and the end effector 12 are connected to each other. Therefore, when a speed difference in the movement route direction between the end effector 12 and the workpiece W is generated in a state (connected state) in which the workpiece W and the end effector 12 are connected to each other, the end effector 12 is subjected to external force from the workpiece W. Also, in the present embodiment, the plurality of robots 10A to 10D performs work in cooperation with each other. In this case, two or more robots, among the robots 10A to 10D, and the workpiece W are sometimes connected to each other. At this time, a speed difference in the movement route direction can be generated among the plurality of robots connected with the workpiece W. In such a case, the end effector 12 is subjected to external force from the workpiece W.

To address this concern, the second control processor 22 detects the magnitude of external force exerted on the end effector 12 by changes in torque (electric current values or the like) of the servo motors 24a to 24g. When the end effector 12 is subjected to a prescribed magnitude or more of external force from the workpiece W, the second control processor 22 performs a prescribed operation for suppressing occurrences of failure of the robot 10 (the robot body 11), deformation and breakage of the workpiece W, and the like. In this manner, external force exerted on the end effector 12 is detected by changes in torque (electric current values or the like) of the servo motors 24a to 24g. This eliminates the need for a force sensor such as a distortion sensor. Consequently, the robot 10 can be reduced in cost.

The second control processor 22 executes, as the above-described prescribed operation, an operation (so-called servo float) of controlling torque of the plurality of servo motors 24a to 24g such that the robot body 11 performs an action of reducing the external force exerted on the end effector 12 from the workpiece W (an action of moving the end effector 12 according to external force). For example, when the end effector 12 is subjected to such external force as to be pushed into the moving direction Dw from the workpiece W, the second control processor 22 moves the end effector 12 into the pushing direction. Alternatively, when the end effector 12 is subjected to such external force as to be pulled opposite the moving direction Dw from the workpiece W, the second control processor 22 moves the end effector 12 into the pulling direction.

The above-described servo float may be performed without limiting the action direction. However, the external force exerted from the moving workpiece W on the end effector 12 is often attributable to a speed difference in the movement route direction of the workpiece W between the end effector 12 and the workpiece W and a speed difference in the movement route direction of the workpiece W among the robots. Accordingly, the external force exerted from the moving workpiece W on the end effector 12 comes to be mainly a force in a direction along the movement route of the workpiece W. Therefore, the second control processor 22 may limit the direction of the above-described action of the end effector 12 for reducing the external force to a direction along the movement route of the workpiece W (the movement direction Dw or the direction opposite the movement direction Dw) (so-called linear servo float).

It is noted that when the end effector 12 is subjected to a prescribed magnitude or more of external force from the workpiece W, the second control processor 22 may, for example, terminate the work of the robot or perform an operation such as outputting an alarm, in addition to or in place of the above-described servo float or linear servo float.

The third control processor 23 controls the robot body 11 of the first robot 10A such that, for example, the first robot 10A performs the above-described prescribed work for one moving workpiece W in cooperation with other robots 10B to 10D arranged along the movement route of the workpiece W. The same applies to the robots 10B to 10D. In any robot controller 20, the third control processor 23 controls the robot body 11 to perform the above-described prescribed work in cooperation with other robots. Accordingly, the robots 10A to 10D can each efficiently execute a prescribed work while suppressing interference with each other.

Also, the third control processor 23 controls the robot body 11 of the first robot 10A such that, for example, the first robot 10A performs a prescribed work for one moving workpiece W in cooperation with another robot 10B having a different working range arranged along the movement route of the workpiece W. The same applies to the robots 10B to 10D. In any robot controller 20, the third control processor 23 controls the robot body 11 to perform the above-described prescribed work in cooperation with another robot having a different workable range. Accordingly, the plurality of robots can perform work for the wide range of the workpiece W while complementing the work range with each other.

It is noted that the operations and the like in the image processor 31 and the data corrector 33 in the higher-level controller 30 are not limited to the above-described example of a share of an operation. The operation in the higher-level controller 30 may be executed by, for example, fewer processors (for example, one processor), or may be executed by more processors further fragmented. Also, the operations and the like of the control processors 21 to 23 in the above-described robot controller 20 are not limited to the above-described example of a share of an operation. The operation in the robot controller 20 may be executed by, for example, fewer processors (for example, one processor), or may be executed by more processors further fragmented.

Furthermore, the shares of the operation of the higher-level controller 30 and the robot controller 20 are not limited to the above-described example. For example, the operations by the image processor 31, the data corrector 33, and the like may be performed by the robot controller 20. Furthermore, the operation in the control processors 21 to 23 may be performed by the higher-level controller 30. Also, the robot controller 20 includes a power supply member (an inverter and the like) for supplying driving power to each servo motor 24. The robot controller 20 may implement this power supply member as an actual apparatus, and perform a function other than power supply by a program executed by a later-described CPU 901 (see FIG. 5). Also, some or all of the control processors 21 to 23 may be mounted as an actual apparatus such as an ASIC, an FPGA, other electrical circuits, and the like to the robot controller 20.

4. Control Contents of Robot Controller

Figure 4:
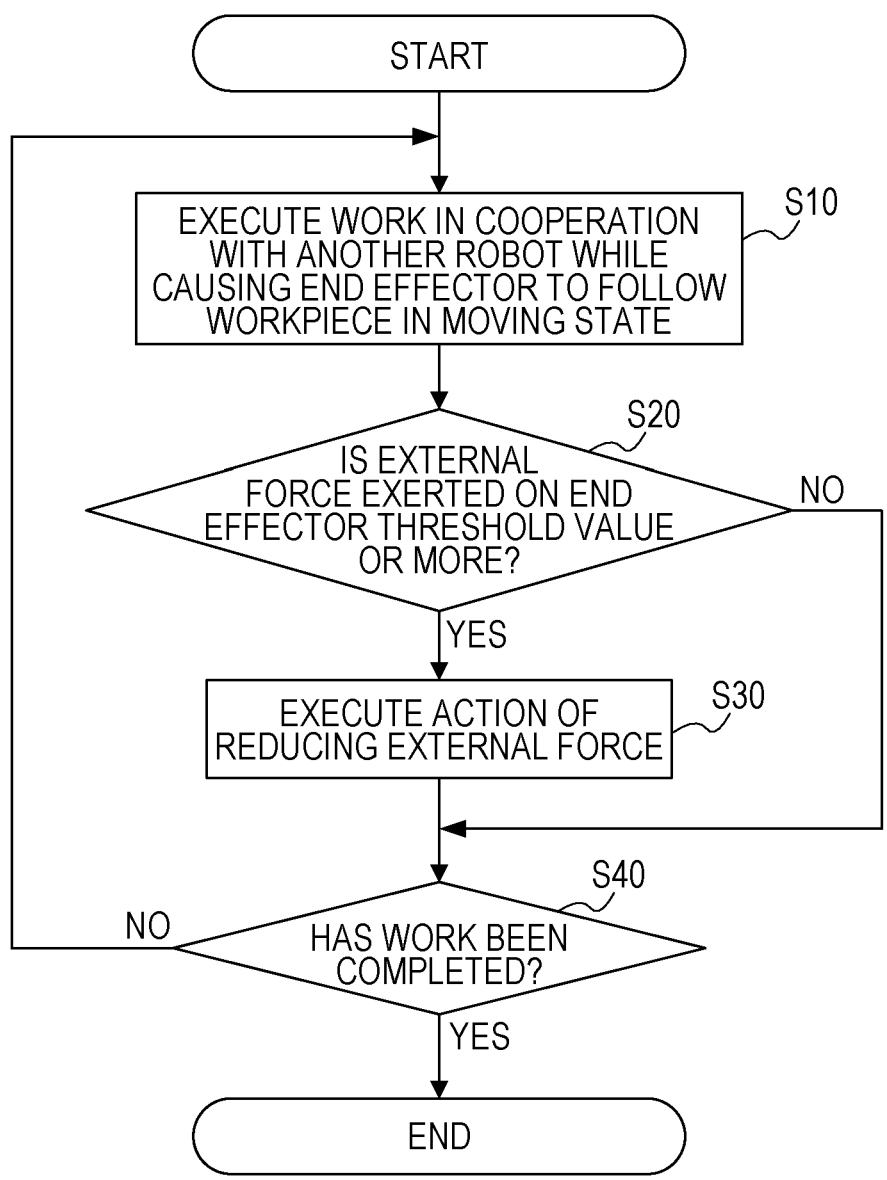
FIG. 4 is a flowchart illustrating an example of contents of control to be executed by a robot controller.

Next, an example of contents of control executed by the robot controller 20 during manufacture of the workpiece W will be described with reference to FIG. 4. Here, the contents of the control by the robot controller 20 in the first robot 10A will be described. Control by the robot controller 20 in each of the second robot 10B, the third robot 10C, and the fourth robot 10D is similar to the control in the first robot 10A.

In step S10, the robot controller 20 controls the plurality of servo motors 24a to 24g of the first robot 10A by the first control processor 21 and the third control processor 23. Accordingly, the robot controller 20 executes a prescribed work for the moving workpiece W in cooperation with the second robot 10B to the fourth robot 10D while causing the end effector 12 to follow the moving workpiece W.

In step S20, the robot controller 20 determines whether external force exerted on the end effector 12 is a previously defined threshold value or more by the second control processor 22. The robot controller 20 (the second control processor 22) can detect external force exerted on the end effector 12 by monitoring changes in torque (electric current values) of the plurality of servo motors 24a to 24g. When the external force exerted on the end effector 12 is a threshold value or more (S20: YES), the robot controller 20 executes the next step S30. When the external force exerted on the end effector 12 is less than a threshold value (S20: NO), the robot controller 20 executes step S40 described later.

In step S30, the robot controller 20 controls the plurality of servo motors 24a to 24g by the second control processor 22 so that the robot body 11 executes an action of reducing the external force exerted on the end effector 12. As previously described, the direction of this action of reducing external force may not be limited, or may be limited to one direction. Thereafter, the robot controller 20 executes step S40.

In step S40, the robot controller 20 determines whether a prescribed work for the workpiece W has been completed by the first control processor 21. The robot controller 20 (the first control processor 21) can determine whether a prescribed work for the workpiece W has been completed, according to, for example, whether reception (payout) of teaching data from the higher-level controller 30 has ended. When a work has not been completed (S40: NO), the robot controller 20 returns to step S10 described above to repeat a similar procedure. When a work has been completed (S40: YES), the robot controller 20 terminates the present flow.

5. Effects of Embodiment

As described above, the robots 10A to 10D according to the present embodiment each includes the robot body 11 and the robot controller 20 which controls the robot body 11. The robot body 11 is arranged, for example, in the vicinity of the movement route of the workpiece W. The robot controller 20 includes the first control processor 21 and the second control processor 22. The first control processor 21 controls the robot body 11 to perform a prescribed work for the moving workpiece W. The second control processor 22 performs a prescribed operation when the robot body 11 is subjected to a prescribed magnitude or more of external force from the workpiece W. Accordingly, the following effects are produced.

That is, in general, the movement and stop of the workpiece W are intermittently performed along the movement route of the workpiece W in the manufacturing line L of the workpiece W. A prescribed work is performed for the workpiece W at rest by the plurality of robots arranged in the vicinity of the workpiece W at rest. In this case, there is a possibility that some robot might not operate because, for example, the workpiece W is outside the workable range depending on, for example, the type (for example, distinguished according to size and/or shape) of the workpiece W. This can cause the operating rate to decrease.

In the present embodiment, the robots 10A to 10D perform a prescribed work for the moving workpiece W. Accordingly, the robots 10A to 10D arranged along a movement route can each sequentially perform work for the workpiece W without stopping the workpiece W. Therefore, the number of unoperated robots can be reduced. Thus, the operating rate can be enhanced.

Also, when the robots 10A to 10D perform work for the moving workpiece W, the robot body 11 (for example, the end effector 12) is subjected to external force from the workpiece W due to, for example, a speed difference in the movement route direction between the robot body 11 and the workpiece W in some cases. In the present embodiment, when this external force is a prescribed magnitude or more, a prescribed operation is executed. For example, the robot body 11 is operated to move corresponding to external force, the work by the robot body 11 is terminated, or an alarm is output. Accordingly, occurrences of failure of the robots 10, deformation and breakage of the workpiece W, and the like can be suppressed. Therefore, the reliability can be enhanced.

Also, in the present embodiment, the robot body 11 particularly includes the plurality of servo motors 24a to 24g which drive the plurality of joint portions. The second control processor 22 performs, as the above-described prescribed operation, an operation of controlling the plurality of servo motors 24a to 24g to cause the robot body 11 to perform an action of reducing external force exerted from the workpiece W.

Accordingly, the position and posture of the robot body 11 can be flexibly controlled such that the robot body 11 moves corresponding to the external force exerted from the workpiece W. Therefore, the robot body 11 can perform a prescribed work for the moving workpiece W while suppressing occurrences of failure of the robot 10 (the robot body 11), deformation and breakage of the workpiece W, and the like.

Also, in the present embodiment, the second control processor 22 particularly performs an operation of controlling the plurality of servo motors 24a to 24g such that the robot body 11 performs an action of reducing external force exerted from the workpiece W (an action of the robot body 11) in a direction along the movement route. Accordingly, the following effects are produced.

That is, the external force exerted on the robot body 11 from the moving workpiece W is often attributable to a speed difference in the movement route direction of the workpiece W between the robot body 11 and the workpiece W and a speed difference in the movement route direction of the workpiece W among the robots. Accordingly, the external force exerted from the moving workpiece W on the robot body 11 comes to be mainly a force in a direction along the movement route of the workpiece W. Therefore, according to the present embodiment, the second control processor 22 may limit the direction of the action by the robot body 11 for reducing external force exerted from the workpiece W to one direction (a direction along the movement route). Thus, occurrences of failure of the robots 10A to 10D, deformation and breakage of the workpiece W, and the like can be suppressed while reducing the burden of the control operation compared to when the second control processor 22 performs a similar operation in all directions.

Also, in the present embodiment, the robot controller 20 of the robot 10 (for example, the first robot 10A) particularly includes the third control processor 23. The third control processor 23 controls the robot body 11 of the first robot 10A such that, for example, the robot body 11 of the first robot 10A performs the above-described prescribed work for one moving workpiece W in cooperation with other robots 10 (for example, the second robot 10B to the fourth robot 10D) arranged along the movement route of the workpiece W. Accordingly, the following effects are produced.

That is, in the present embodiment, the plurality of robots 10A to 10D arranged along the movement route perform a prescribed work for one moving workpiece W while avoiding interference with each other. Therefore, the work efficiency can be enhanced.

It is noted that in this case, the robot body 11 can be subjected to external force from the workpiece W due to not only a speed difference between the robot body 11 and the workpiece W but also, for example, a speed difference in the movement route direction among the robots. Thus, in the present embodiment, the robot body 11 is more likely to be subjected to external force from the workpiece W. Therefore, the suppression effect of occurrences of failure of the robots 10A to 10D, deformation and breakage of the workpiece W, and the like by the execution of a prescribed operation can be enhanced in effectiveness.

Also, in the present embodiment, the third control processor 23 of the robot 10 (for example, the first robot 10A) particularly controls the robot body 11 of the first robot 10A to perform a prescribed work for one moving workpiece W in cooperation with another robot 10 (for example, the second robot 10B) having a different workable range arranged along the movement route.

Accordingly, the plurality of robots having different workable ranges can perform work for the wide range of the workpiece W while complementing the work range with each other.

Also, in the present embodiment, the robot body 11 particularly includes the end effector 12 for performing the above-described prescribed work for the workpiece W. The first control processor 21 controls the robot body 11 to perform, as the above-described prescribed work, a work containing a process in which the moving workpiece W is temporarily brought into contact with the end effector 12 of the robot body 11. Accordingly, the following effects are produced.

That is, when the robot body 11 performs such a work for the moving workpiece W, generation of a speed difference in the movement route direction between the robot body 11 and the workpiece W in a state (connected state) in which the workpiece W and the end effector 12 of the robot body 11 are connected to each other causes the robot body 11 to be subjected to external force from the workpiece W. Also, when the plurality of robots 10A to 10D performs such a work, generation of a speed difference in the movement route direction among the plurality of robots connected to the workpiece W in a connected state between the workpiece W and two or more robots among the robots 10A to 10D causes the robot body 11 to be subjected to external force from the workpiece W. Thus, in the present embodiment, the robot body 11 is more likely to be subjected to external force from the workpiece W. Therefore, the suppression effect of occurrences of failure of the robots 10 (10A to 10D), deformation and breakage of the workpiece W, and the like can be enhanced in effectiveness.

It is noted that the portion of the end effector 12 to be brought into contact with the workpiece W is, for example, the work portion of the end effector 12. This work portion is brought into contact with the workpiece W when, for example, the workpiece W is grasped or pressed. In the present embodiment, the end effector 12 is, for example, a gun for spot welding, and the work portion is a portion which sandwiches the workpiece W.

Also, in the present embodiment, the robot body 11 is particularly a seven-axis robot having seven joint portions.

Accordingly, the robot body 11 can change its posture more flexibly and freely compared to a robot having six or less axes so as to have a wider workable range. As a result, the installation space of the robot system 1 can be reduced, and work can be performed for a wider range of the workpiece W.

Also, in the present embodiment, the robot body 11 particularly includes the end effector 12 which performs the above-described prescribed work for the workpiece W. When the end effector 12 is subjected to a prescribed magnitude or more of external force from the workpiece W, the second control processor 22 performs the above-described prescribed operation. Accordingly, the following effects are produced.

That is, in the present embodiment, an end effector for performing a work containing the process in which the moving workpiece W is temporarily brought into contact with the end effector 12 is used as the end effector 12. The above-described work is, for example, reveting, nailing, spot welding, stapling, and bolting. When such a work is performed, generation of a speed difference in the movement route direction between the end effector 12 and the workpiece W both being in a connected state causes the end effector 12 to be subjected to external force from the workpiece W. Also, when the plurality of robots 10A to 10D perform such a work, and the end effectors 12 of two or more robots 10 and the workpiece W are in a connected state, generation of a speed difference in the movement route direction among the robots causes the end effector 12 to be subjected to external force from the workpiece W. Thus, in the present embodiment, the end effector 12 is more likely to be subjected to external force from the workpiece W. Therefore, the suppression effect of occurrences of failure of the robots 10, deformation and breakage of the workpiece W, and the like by the execution of the above-described prescribed operation can be enhanced in effectiveness.

6. Hardware Configuration Example of Controller

Next, a hardware configuration example of the above-described robot controller 20 will be described with reference to FIG. 5. It is noted that the higher-level controller 30 can have a hardware configuration similar to the robot controller 20.

Figure 5:
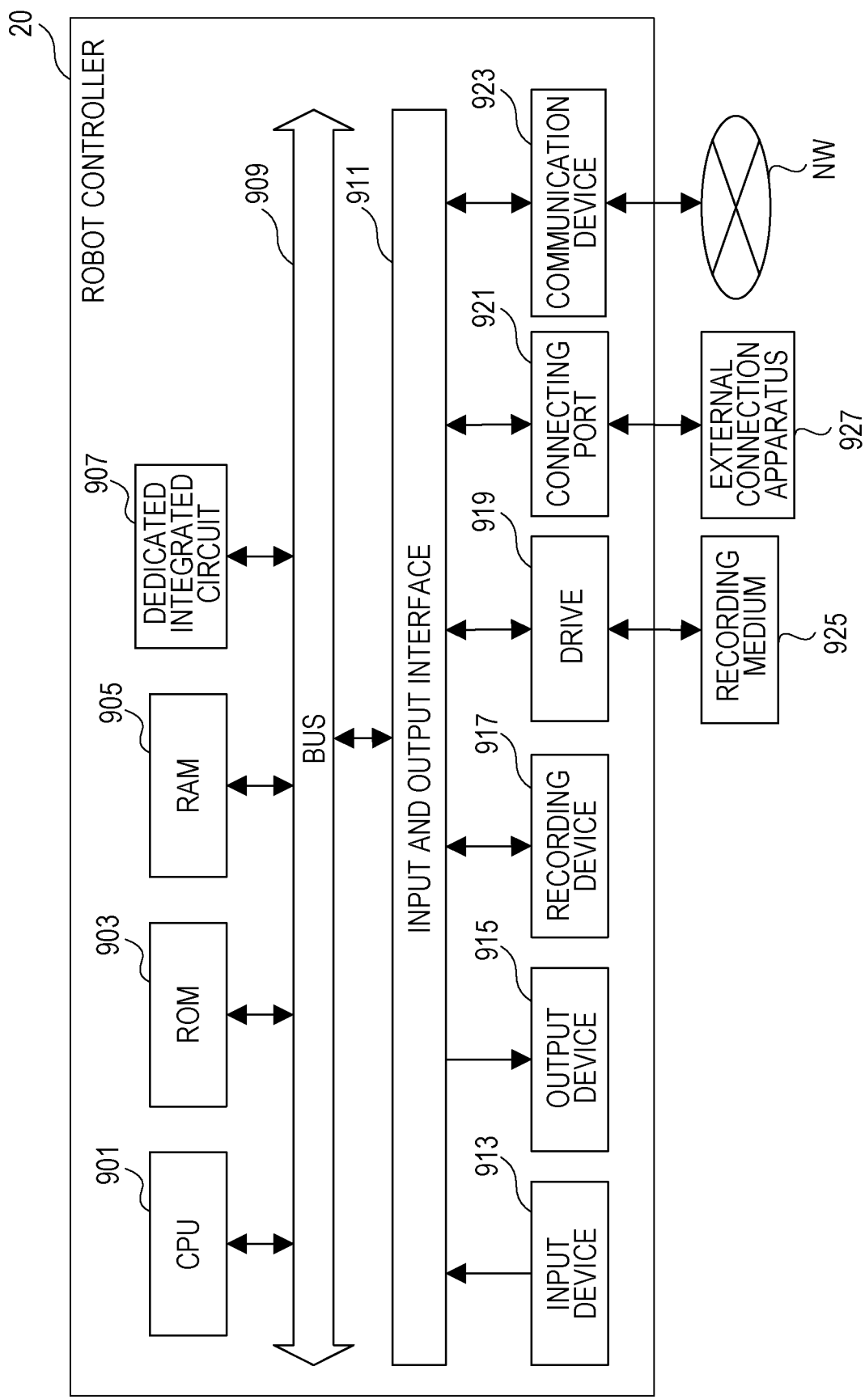
FIG. 5 is an explanatory view illustrating an example of a hardware configuration of a robot controller.

As illustrated in FIG. 5, the robot controller 20 includes, for example, a CPU 901, a ROM 903, a RAM 905, a dedicated integrated circuit 907 created for a specific use such as an ASIC or an FPGA, an input device 913, an output device 915, a recording device 917, a drive 919, a connecting port 921, and a communication device 923. These members are connected to each other via a bus 909 and/or an input and output interface 911 in such a manner that a signal can be transmitted to each other.

A program can be recorded in, for example, the ROM 903, the RAM 905, and the recording device 917. The recording device 917 is, for example, a hard disk, and functions as the previously described storage 32 and the like.

Also, a program can be temporarily or non-temporarily (permanently) recorded in a removable recording medium 925. Examples of the recording medium 925 include a magnetic disk such as a flexible disk, various optical disks such as a CD, an MO disk and a DVD, and a semiconductor memory. Such a recording medium 925 can also be provided as a so-called packaged software. In this case, the program recorded in the recording medium 925 may be read by the drive 919, and recorded in the above-described recording device 917 via the input and output interface 911, the bus 909, and/or the like.

Also, a program can be recorded in, for example, a download site, another computer, and another recording device (not shown). In this case, a program is transferred via a network NW such as a LAN and the Internet, and received by the communication device 923. The program received by the communication device 923 may be recorded in the above-described recording device 917 via the input and output interface 911, the bus 909, and/or the like.

Also, a program can be recorded in, for example, an appropriate external connection apparatus 927. In this case, a program may be transferred via an appropriate connecting port 921, and recorded in the above-described recording device 917 via the input and output interface 911, the bus 909, and/or the like.

Then, the CPU 901 executes various operations according to programs recorded in the above-described recording device 917 to achieve (perform) operations by the above-described first control processor 21, second control processor 22, third control processor 23, and the like. At this time, for example, the CPU 901 may directly read and execute a program from the above-described recording device 917, or may temporarily load a program to the RAM 905 and then execute the program. Furthermore, for example, the CPU 901 also can receive a program via the communication device 923, the drive 919, or the connecting port 921. In this case, the CPU 901 may directly execute the received program without recording the program in the recording device 917.

Also, the CPU 901 may perform various operations based on signals and information input from, for example, the input device 913 such as a mouse, a keyboard, and a microphone (not shown) as necessary.

Then, the CPU 901 may output the result obtained by executing the above-described operation through, for example, the output device 915 such as a display device and/or a voice output device. Furthermore, as necessary, the CPU 901 may transmit this operation result via the communication device 923 and/or the connecting port 921, or may record the operation result in the above-described recording device 917 and/or the recording medium 925.

It is noted that when there are expressions such as "perpendicular", "parallel", and "planar" in the above description, these expressions do not indicate being strictly "perpendicular", "parallel", "planar", and the like. That is, these expressions of "perpendicular", "parallel", and "planar" allow tolerances and errors in terms of design and manufacture, and indicate "substantially perpendicular", "substantially parallel", and "substantially planar" respectively.

Also, when there are expressions such as "identical", "same", "equal", and "different" regarding the visual dimension, size, shape, position, and the like of a member in the above description, these expressions do not indicate being strictly "identical", "same", "equal", "different", and the like. That is, these expressions of "identical", "same", "equal", and "different" allow tolerances and errors in terms of design and manufacture, and indicate "substantially identical", "substantially same", "substantially equal", and "substantially different" respectively.

Also, other than the above description, the methods according to the above-described embodiment may be appropriately combined to be used. In addition, although other examples are not indicated here, the above-described embodiment may be variously modified and implemented within the range not departing from the gist of the technology according to the present disclosure.

Embodiments of the present disclosure may be the following first to eighth robots, the following first control method of a robot, and the following first to eighth manufacturing method of a workpiece.

The first robot includes a robot body arranged in the vicinity of a movement route of a workpiece and a robot controller which controls the robot body, in which the robot controller includes a first control processor which controls the robot body to perform a prescribed work for the workpiece in a moving state, and a second control processor which performs a prescribed operation when the robot body is subjected to a prescribed magnitude or more of external force from the workpiece.

The second robot is the first robot in which the robot body includes a plurality of servo motors which drives a plurality of joint portions, and the second control processor performs, as the prescribed operation, an operation of controlling the plurality of servo motors to cause the robot body to perform an action of reducing external force exerted from the workpiece.

The third robot is the second robot in which the second control processor performs an operation of controlling the plurality of servo motors to cause the robot body to perform an action of reducing external force exerted from the workpiece in a direction along the movement route.

The fourth robot is any one of the first to third robots in which the robot controller includes a third control processor which controls the robot body to perform the prescribed work for one workpiece in a moving state in cooperation with another robot arranged along the movement route.

The fifth robot is the fourth robot in which the third control processor controls the robot body to perform the prescribed work for one workpiece in a moving state in cooperation with another robot having a different workable range arranged along the movement route.

The sixth robot is any one of the first to fifth robots in which the first control processor controls the robot body to perform, as the prescribed work, a work containing a process in which the workpiece in a moving state is temporarily brought into contact with an end of the robot body.

The seventh robot is any one of the first to sixth robots in which the robot body is a seven-axis robot having seven joint portions.

The eighth robot is any one of the first to seventh robots in which the robot body includes an end effector for performing the prescribed work for the workpiece, and the second control processor performs the prescribed operation when the end effector is subjected to a prescribed magnitude or more of external force from the workpiece.

The first control method of a robot is a control method of a robot arranged in the vicinity of a movement route of a workpiece, including performing a prescribed work for the workpiece in a moving state, and performing a prescribed operation when subjected to a prescribed magnitude or more of external force from the workpiece.

The first manufacturing method of a workpiece includes performing a prescribed work for the workpiece in a moving state by a robot arranged in the vicinity of a movement route of the workpiece, and performing a prescribed operation when the robot is subjected to a prescribed magnitude or more of external force from the workpiece.

The second manufacturing method of a workpiece is the first manufacturing method of a workpiece, in which the robot includes a plurality of servo motors which drives a plurality of joint portions, and performing the prescribed operation includes performing an operation of controlling the plurality of servo motors to cause the robot to perform an action of reducing external force exerted from the workpiece.

The third manufacturing method of a workpiece is the second manufacturing method of a workpiece, in which performing the prescribed operation includes performing an operation of controlling the plurality of servo motors to cause the robot to perform an action of reducing external force exerted from the workpiece in a direction along the movement route.

The fourth manufacturing method of a workpiece is any one of the first to third manufacturing methods of a workpiece, in which a plurality of robots is arranged along the movement route, and performing the prescribed work includes performing the prescribed work for one workpiece in a moving state in cooperation among the plurality of robots.

The fifth manufacturing method of a workpiece is the fourth manufacturing method of a workpiece, in which the plurality of robots contains the plurality of robots having different workable ranges, and performing the prescribed work includes performing the prescribed work for one workpiece in a moving state in cooperation among the plurality of robots having different workable ranges.

The sixth manufacturing method of a workpiece is any one of the first to fifth manufacturing methods of a workpiece, in which performing the prescribed work includes performing a work containing a process in which the workpiece in a moving state and an end of the robot are temporarily brought into contact with each other.

The seventh manufacturing method of a workpiece is any one of the first to sixth manufacturing methods of a workpiece, in which performing the prescribed work includes performing the prescribed work for the workpiece in a moving state by a seven-axis robot having seven joint portions.

The eighth manufacturing method of a workpiece is any one of the first to seventh manufacturing methods of a workpiece, in which the robot includes an end effector for performing the prescribed work for the workpiece, and performing the prescribed operation includes performing the prescribed operation when the end effector is subjected to a prescribed magnitude or more of external force from the workpiece.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot comprising:
   a robot body including a base that is stationary with respect to a floor surface on which a conveyor is provided;
   a control processor configured to control an end effector of the robot body to perform a work on a workpiece while the workpiece is conveyed by the conveyor at a conveyance speed in a conveyance direction and while the end effector moves at an end effector moving speed in the conveyance direction;
   a detection circuit configured to detect external force which the robot body receives from the workpiece and which is caused due to a speed difference between the conveyance speed and the end effector moving speed during a state of moving of the workpiece while the end effector follows the workpiece to perform the work on the workpiece while the workpiece is conveyed by the conveyor;
   a memory to store a threshold force; and
   a determining circuit configured to determine whether the external force is equal to or larger than the threshold force.

2. The robot according to claim 1, wherein the control processor is configured to perform an operation if the external force is determined to be equal to or larger than the threshold force.

3. The robot according to claim 1, wherein the determining circuit is configured to determine whether the external force is equal to or larger than the threshold force while the robot body performs the work on the workpiece.

4. The robot according to claim 1,
   wherein the robot body includes a plurality of servo motors which drive a plurality of joint portions, and
   wherein the control processor performs an operation of controlling the plurality of servo motors to cause the robot body to perform an action of reducing the external force exerted from the workpiece if the external force is determined to be equal to or larger than the threshold force.

5. The robot according to claim 4, wherein the control processor performs an operation of controlling the plurality of servo motors to cause the robot body to perform the action of reducing the external force exerted from the workpiece in a direction along a conveyance route of the workpiece if the external force is determined to be equal to or larger than the threshold force.

6. The robot according to claim 1, further comprising:
   an additional control processor configured to control the robot body to work on the workpiece in cooperation with another robot arranged along a conveyance route of the workpiece if the external force is determined to be equal to or larger than the threshold force.

7. The robot according to claim 6, wherein the additional control processor controls the robot body to work on the workpiece in cooperation with the another robot having a different workable range arranged along the conveyance route if the external force is determined to be equal to or larger than the threshold force.

8. The robot according to claim 1,
wherein the robot body includes an end effector to work on the workpiece, and
wherein the control processor controls the robot body to perform a work containing a process in which the workpiece and the end effector of the robot body are temporarily brought into contact with each other if the external force is determined to be equal to or larger than the threshold force.

9. The robot according to claim 1, wherein the robot body is a seven-axis robot having seven joint portions.

10. The robot according to claim 1,
wherein the robot body includes an end effector to work on the workpiece, and
wherein the control processor performs an operation when the end effector receives external force from the workpiece that is equal to or larger than the threshold force.

11. The robot according to claim 1,
wherein the robot body includes a servo motor configured to move the robot body, and
wherein the detection circuit is configured to detect the external force based on torque of the servo motor.

12. The robot according to claim 1, wherein the base of the robot body is provided on the floor surface.

13. A control method of a robot, comprising:
providing the robot including a base that is stationary with respect to a floor surface on which a conveyor is provided;
controlling an end effector of the robot to perform a work on a workpiece while the workpiece is conveyed by the conveyor at a conveyance speed in a conveyance direction and while the end effector moves at an end effector moving speed in the conveyance direction;
detecting external force which the robot receives from the workpiece and which is caused due to a speed difference between the conveyance speed and the end effector moving speed during a state of moving of the workpiece while the end effector follows the workpiece to perform the work on the workpiece while the workpiece is conveyed by the conveyor;
storing a threshold force; and
determining whether the external force is equal to or larger than the threshold force.

14. A machining method of a workpiece, comprising:
providing a robot including a base that is stationary with respect to a floor surface on which a conveyor is provided;
performing a work on a workpiece by the robot while the workpiece is conveyed by the conveyor at a conveyance speed in a conveyance direction and while an end effector of the robot moves at an end effector moving speed in the conveyance direction;
detecting external force which the robot receives from the workpiece and which is caused due to a speed difference between the conveyance speed and the end effector moving speed during a state of moving of the workpiece while the end effector follows the workpiece to perform the work on the workpiece while the workpiece is conveyed by the conveyor;
storing a threshold force; and
determining whether the external force is equal to or larger than the threshold force.

15. The machining method according to claim 14,
wherein the robot includes a plurality of servo motors which drive a plurality of joint portions, and
wherein an operation of controlling the plurality of servo motors to cause the robot to perform an action of reducing the external force exerted from the workpiece is performed if the external force is equal to or larger than the threshold force.

16. The machining method according to claim 15, wherein an operation of controlling the plurality of servo motors to cause the robot to perform the action of reducing the external force exerted from the workpiece in a direction along a conveyance route of the workpiece is performed if the external force is equal to or larger than the threshold force.

17. The machining method according to claim 14,
wherein a plurality of robots is arranged along a conveyance route of the workpiece, and
wherein a work on the workpiece by the plurality of robots in cooperation with each other is performed if the external force is equal to or larger than the threshold force.

18. The machining method according to claim 17,
wherein at least two robots of the plurality of robots have different workable ranges, and
wherein a work on the workpiece by the at least two robots in cooperation with each other is performed if the external force is equal to or larger than the threshold force.

19. The machining method according to claim 14,
wherein the robot body includes an end effector to work on the workpiece, and
wherein a work containing a process in which the workpiece and the end effector of the robot are temporarily brought into contact with each other is performed if the external force is equal to or larger than the threshold force.

20. The machining method according to claim 14, wherein the robot is a seven-axis robot having seven joint portions.

21. The machining method according to claim 14,
wherein the robot includes an end effector to work on the workpiece, and
wherein an operation is performed when the end effector receives external force from the workpiece that is equal to or larger than the threshold force.

* * * * *